United States Patent Office 3,492,299
Patented Jan. 27, 1970

3,492,299
BENZOTHIAZINE DIOXIDE CARBOXYLATES
Chris Royce Rasmussen, Ambler, Pa., assignor to McNeil Laboratories, Inc., a corporation of Pennsylvania
No Drawing. Filed Feb. 21, 1968, Ser. No. 707,282
Int. Cl. C07d 99/10, 93/02; C08k 1/56
U.S. Cl. 260—243
3 Claims

ABSTRACT OF THE DISCLOSURE

Benzothiazine dioxide carboxylates of the formula:

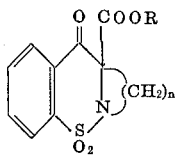

are produced, wherein R is ethyl and $n$ is an integer from 2 to 3, which are useful as ultra-violet light absorbers.

---

This invention relates to novel benzothiazine dioxide carboxylates and, more particularly, to such carboxylates having the formula:

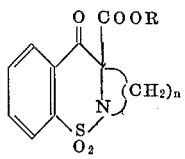 (I)

wherein R is ethyl and $n$ is an integer from 2 to 3.

The compounds of Formula I are obtained by condensation of ethyl 4-hydroxy-2H-1,2-benzothiazine-3-carboxylate-1,1-dioxide (II) with an appropriate alkylene α,ω-dihalide, such as, for example, ethylene dibromide, ethylene dichloride, trimethylene dibromide and the like in a suitable organic solvent, e.g., dimethylformamide (DMF), in the presence of a base. The reaction scheme may be illustrated as follows:

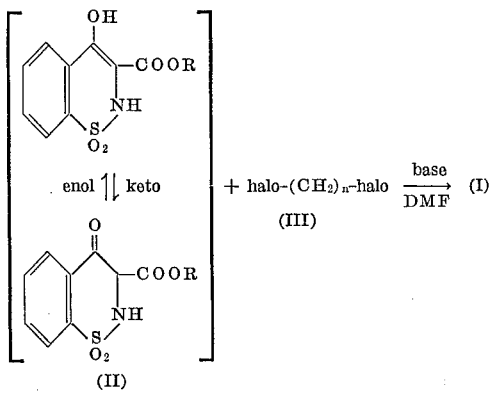

The compounds (I) of this invention absorb ultra-violet (U.V.) light which makes them useful as U.V.-screening materials. Because of their general solubility in organic materials, they may be used as U.V.-absorbers in plastics and resins, such as, for example, polystyrene, polyethylene, polypropylene, polyacrylics (e.g., methacrylate resins, polyacrylamides, polyacrylonitrile fibers, etc.), polyamide (e.g., nylon) fibers and polyester fibers. The inclusion of about 0.01–5.0 percent of the absorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

When $n$ is 2, the corresponding subject compound is denoted as ethyl 9,9a-dihydro-9-oxoazetidino[1,2-b]2H-1,2-benzothiazine-9a-carboxylate-4,4-dioxide, and, when $n$ is 3, as ethyl 10,10a-dihydro-10-oxopyrrolidino[1,2-b]2H-1,2-benzothiazine-10a-carboxylate-5,5-dioxide.

The following examples are intended to illustrate, but not to limit, the scope of the present invention.

EXAMPLE I

Ethyl 4-hydroxy-2H-1,2-benzothiazine-3-carboxylate-1,1-dioxide

To a solution of 42.6 g. (1.85 g. atoms) of sodium dissolved in 800 ml. of absolute ethanol at 40° C. is added 249.5 g. (0.926 mole) of ethyl 3-oxo-1,2-benzisothiazoline-2-acetate-1,1-dioxide. The yellow mixture is warmed to 58–70° C. for 2 hrs. During the course of the reaction, a yellow sodium salt separates. The reaction mixture is then poured into an ice-concentrated aqueous hydrochloric acid (150 ml.) mixture. The resulting viscous light yellow liquid is extracted into ether (1×2 liters; 1×1 liter). The combined ether extracts are dried over sodium sulfate-Norite A and the solvent is removed in vacuo to leave a viscous residue containing some suspended crystals. Ether trituration affords a first crop of ethyl 4-hydroxy-2H-1,2-benzothiazine-3-carboxylate-1,1-dioxide, M.P. 139–141° C., which is filtered off. To the ether filtrate is added benzene (200 ml.) and a few milliliters of cyclohexane. Overnight standing at 10–15° C. affords a second crop of the product. Recrystallization of the combined crops from acetone[1] ethyl 4-hydroxy-2H-1,2-benzothiazine-3-carboxylate - 1,1-dioxide as large irregular almost colorless crystals, M.P. 139.5–141.5° C.

Analysis.—Calcd. for $C_{11}H_{11}NO_5S$ (269.28): C, 49.06%; H, 4.12%; N, 5.20%; S, 11.91%. Found: C, 49.12%; H, 4.18%; N, 4.88%; S, 11.89%.

EXAMPLE II

Ethyl 9,9a-dihydro-9-oxoazetidino[1,2-b]2H-1,2-benzothiazine-9a-carboxylate-4,4-dioxide To a solution of 5.75 g. (0.25 g. atom) of sodium in 100 ml. of absolute methanol is added 100 ml. of DMF and the mixture is concentrated in vacuo to about 75 ml. A solution of ethyl 4-hydroxy-2H-1,2-benzothiazine-3-carboxylate-1,1-dioxide (26.9 g., 0.1 mole) in 100 ml. of DMF is added and the solution is cooled in an ice-water bath to 10° C. 23.5 grams (0.125 mole) of ethylene dibromide is added in one portion with stirring. The mixture is heated for 2 hrs. on a steam bath and then most of the DMF is removed in vacuo. About 500 ml. of water is added and the resulting brown oil is extracted with four 250 ml. portions of ether. The combined ether extracts are shaken with five 50 ml. portions of aqueous sodium carbonate (10%) and twice with 50 ml. portions of 1 N NaOH, and once with 50 ml. of aqueous saturated sodium bicarbonate solution. After an additional washing with one 50 ml. portion of saturated aqueous sodium chloride, the ether layer is dried over anhydrous magnesium sulfate and the ether is then removed in vacuo to give a syrupy residue which is redissolved in 125 ml. of anhydrous ether and placed in a refrigerator for two days. Several crops of crystals contaminated with yellow oil are obtained by successive filtrations and concentration of the mother liquor. Fractional recrystallization from ether yields the pure product, ethyl 9,9a-dihydro-9-oxoazetidino[1,2-b] 2H - 1,2 - benzothiazine-9a-carboxylate-4,4-dioxide, M.P. 86.5–88.5° C.

*Analysis.*—Calcd. for $C_{13}H_{13}NO_5S$ (295.32): C, 52.87%; H, 4.44%; N, 4.74%; S, 10.86%. Found: C, 53.07%; H, 4.91%; N, 4.89%; S, 10.88%.

EXAMPLE III

Ethyl 10,10a-dihydro-10-oxopyrrolidino[1,2-b]2H-1,2-benzothiazine-10a-carboxylate-5,5-dioxide A solution of 2,3 g. (0.1 g. atom) of dissolved sodium in absolute ethanol is evaporated to near dryness in vacuo. To this residue is added 10 ml. of DMF. This solution is added to a solution of 13.45 g. (0.05 mole) of ethyl 4-hydroxy-2H-1,2-benzothiazine-3-carboxylate - 1,1 - dioxide and 20.2 g. (0.1 mole) of trimethylene dibromide in about 30 ml. of DMF. The reaction mixture becomes quite warm and is stirred and allowed to cool to room temperature. Removal of the DMF in vacuo gives a thick syrup which is treated with water and ether (about 150 ml. each). The ether layer is separated and washed with 10% sodium carbonate solution until no yellow color is discernible in the aqueous layer, then washed once with saturated sodium bicarbonate solution and once with water. The ether layer is dried over sodium sulfate-charcoal, filtered, and the solvent removed in vacuo. Trituration with a little fresh ether yields crystals of the product. Recrystallization from ether affords pure ethyl 10,10a-dihydro - 10 - oxopyrrolidino[1,2 - b]2H-1,2-benzothiazine, 10a-carboxylate-5,5-dioxide, M.P. 80.5–83° C.

*Analysis.*—Calcd. for $C_{14}H_{15}NO_5S$ (309.35): C, 54.36%; H, 4.89%. Found: C, 54.24%; H, 4.93%.

What is claimed is:

1. A benzothiazine dioxide carboxylate having the formula:

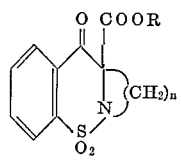

wherein R is ethyl and $n$ is an integer from 2 to 3.

2. The compound of claim 1 which is ethyl 9,9a-dihydro - 9 - oxoazetidino[1,2-b]2H-1,2-benzothiazine-9a-carboxylate-4,4-dioxide.

3. The compound of claim 1 which is ethyl 10,10a-dihydro - 10 - oxopyrrolidino[1,2-b]2H-1,2-benzothiazine 10a-carboxylate-5,5-dioxide.

References Cited

UNITED STATES PATENTS

| | | | |
|---|---|---|---|
| 3,198,793 | 8/1965 | Hilger et al. | 260—243 |
| 3,408,347 | 10/1968 | Shavel et al. | 260—243 |
| 3,420,823 | 1/1969 | Waring | 260—243 |
| 3,427,311 | 2/1969 | Loev | 260—243 |

HENRY R. JILES, Primary Examiner

JOHN M. FORD, Assistant Examiner

U.S. Cl. X.R.

252—300; 260—458

PO-1050
(5/69)

UNITED STATES PATENT OFFICE
CERTIFICATE OF CORRECTION

Patent No. 3,492,299            Dated January 27, 1970

Inventor(s) Chris R. Rasmussen

It is certified that error appears in the above-identified patent and that said Letters Patent are hereby corrected as shown below:

In column 2, lines 34 and 35, the word "acetonea$^1$." should be deleted and the phrase -- acetone benzene yields pure -- should be inserted after "from".

SIGNED AND
SEALED
JUN 23 1970

(SEAL)
Attest:

Edward M. Fletcher, Jr.
Attesting Officer

WILLIAM E. SCHUYLER, JR.
Commissioner of Patents